United States Patent [19]

Zavatkay

[11] 4,340,190

[45] Jul. 20, 1982

[54] SEAT BELT RETRACTOR SPRING ASSEMBLY

[75] Inventor: Robert J. Zavatkay, Torrington, Conn.

[73] Assignee: Barnes Group Inc., Bristol, Conn.

[21] Appl. No.: 151,614

[22] Filed: May 20, 1980

[51] Int. Cl.³ ................... A62B 35/00; B65H 75/48
[52] U.S. Cl. .................................. 242/107; 185/45
[58] Field of Search ...................... 242/107–107.7;
29/446; 185/37, 39, 45

[56] References Cited

U.S. PATENT DOCUMENTS

| | | | |
|---|---|---|---|
| 3,689,004 | 9/1972 | Brown et al. | 242/107.6 X |
| 4,088,280 | 5/1978 | Arlauskas et al. | 242/107 |
| 4,159,809 | 7/1979 | Rawson | 242/107 |

*Primary Examiner*—John M. Jillions
*Attorney, Agent, or Firm*—Scrivener, Clarke, Scrivener & Johnson

[57] ABSTRACT

The invention is a spring device which is connected to the shaft on which a seat belt or the like is spirally wound and which is operable to retract the strip to a wound condition after it is extended and released, in which means are provided for holding the spring in pre-wound condition prior to installation in a seat belt assembly.

1 Claim, 3 Drawing Figures

SEAT BELT RETRACTOR SPRING ASSEMBLY

SUMMARY OF THE INVENTION

The invention provides a spring device consisting of a cylindrical casing containing a fully wound spiral spring connected at its outer end to the periphery of the casing and at its inner end to a shaft rotatably mounted in the casing, and a U-shaped clip the legs of which extend through a wall of the casing and engage the shaft to hold the spring in fully wound condition ready for installation as the re-wind means of a retractable seat belt assembly.

DESCRIPTION OF THE INVENTION

Figure 1:
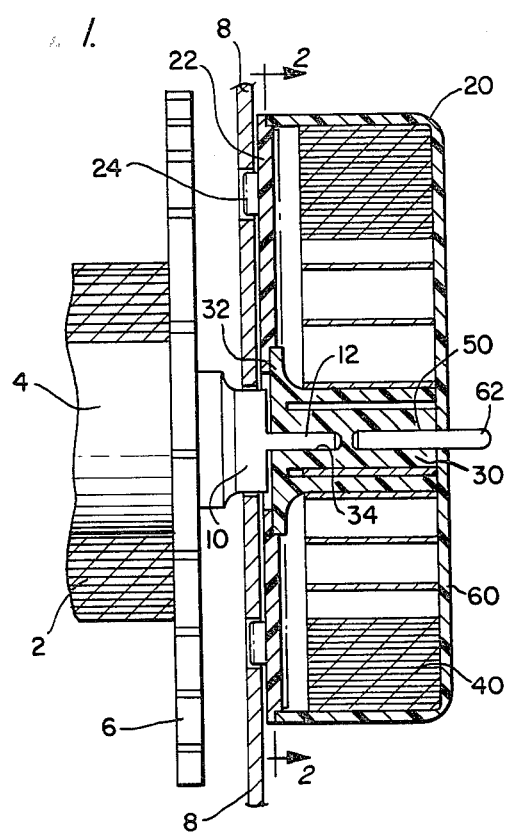
FIG. 1 is a transverse sectional view showing a wound seat belt in operative association with the retractor assembly of the present invention.
Figure 2:
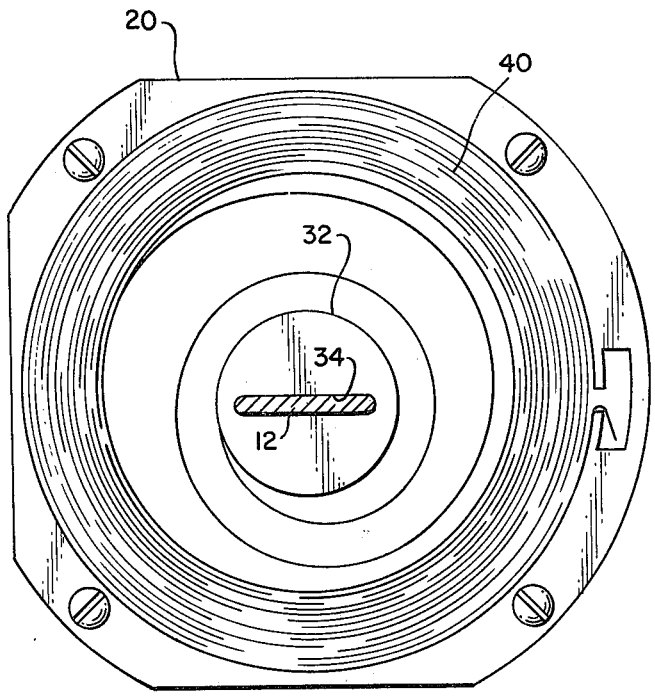
FIG. 2 is an elevational view taken on line 2—2 of FIG. 1.
Figure 3:
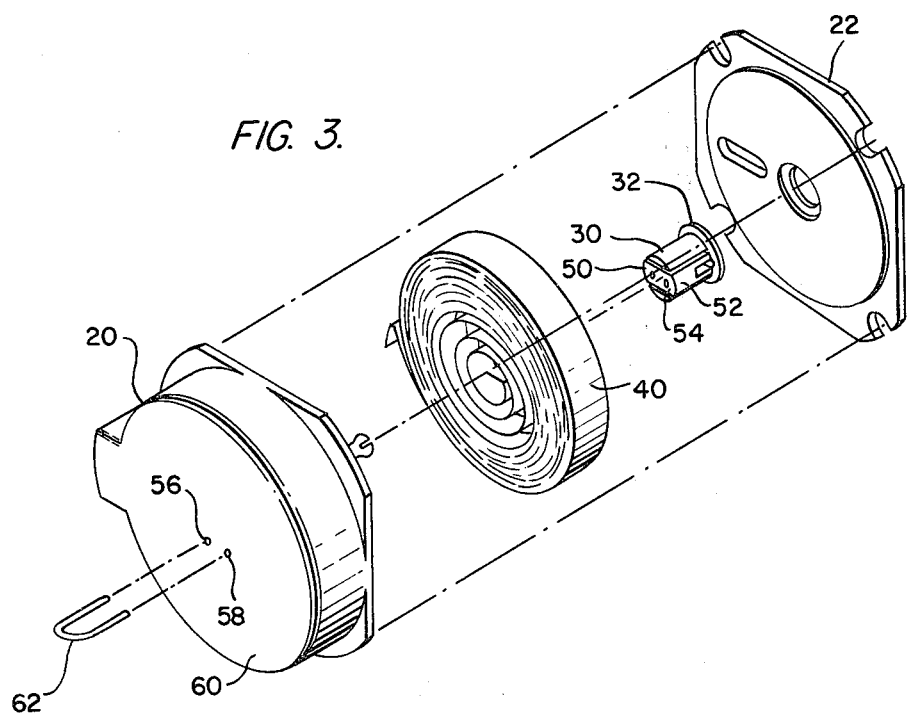
FIG. 3 is an exploded perspective view showing the parts which comprise the invention.

The preferred embodiment of the spring device provided by the invention for retracting to wound condition a strip of material such as a seat belt is disclosed in FIG. 1 in operative association with a seat belt 2 which is spirally wound on a reel comprising a rotatable shaft 4 and end plates 6, only one of which is shown. The seat belt assembly is rotatably mounted on one or more plates 8 which form part of the mainframe of the assembly. A shaft 10 is connected axially to the rotatable seat belt assembly and extends through plate 8 and is provided on its outer end surface with a diametrically extending blade 12.

The retractor device provided by the invention comprises a fixed spring housing formed of a cup-shaped cover 20 and a plate 22 which closes the open side of the cover and is mounted on fixed plate 8 by any suitable means 24. A shaft 30 is mounted within the housing and is journaled in plate 22 for rotation with respect to the fixed cover and plate which form the spring housing. The end surface 32 of the shaft, which is the end surface adjacent the wound seat belt assembly, is formed with a diametrically extending kerf 34 which receives the blade 12 on shaft 10 which forms part of the rotatable seat belt assembly. A spirally wound spring 40 surrounds the shaft 30 within the housing and has its ends connected respectively to the shaft 30 and to the peripheral wall of the cover 20.

In the manufacture and installation of a retractable seat belt apparatus it is desirable to place and hold the retractor spring in fully wound condition prior to installation so that when it is assembled to a seat belt apparatus and the spring is released the stored energy in the spring will cause the seat belt to be placed in its fully retracted condition.

Means are provided by the invention for maintaining the spring of a belt retracting spring device in such a fully wound condition. Such means comprise spaced holes 50, 52 in the shaft 30 which extend axially of the shaft and open into its end surface 54 which is the surface adjacent the bottom wall 60 of the cover 20 and therefore opposite the seat belt assembly. These holes are aligned with spaced openings 56, 58 in the bottom wall of the cover, and the parallel legs of a U-shaped clip 62 are passed through these openings and into the holes 50, 52 in the shaft, thereby locking the shaft from rotation.

It will be understood that those skilled in the arts to which this invention relates that in assembling the spring retractor assembly the spring will be adjusted to its fully wound condition and then locked in this condition by inserting the legs of the clip 62 through openings 56, 58 in the cover 20 and into the holes 50, 52 in shaft 30, thereby locking the spring in its wound condition. The spring retractor assembly is then operatively connected to the seat belt assembly with the blade 12 on the belt shaft 10 positioned in the kerf 34 in shaft 30 in order to operatively connect the two shafts, after which the clip 62 is removed, releasing the spring and causing it to actuate the seat belt to its retracted condition.

While the invention has been described as applied to a spring assembly in which the spring is held by the clip in its fully wound condition it will be understood that the invention is equally useful in any spring assembly without regard to the degree of pre-winding of the spring.

I claim:
1. A spring operated seat belt retractor device, comprising:
  (a) a frame,
  (b) a casing adapted to be connected to the frame and comprising:
   (i) a cylindrical cup having a peripheral wall, a bottom wall and an open side,
   (ii) a substantially planar cover connected to the cup and entirely closing its open side and having outer and inner surfaces,
  (c) a shaft rotatably mounted concentrically within the casing with its one end within and closely adjacent the bottom wall of the cup,
  (d) a spiral spring within the casing having its ends connected to the periphery of the cup and to the shaft, and
  (e) means for releasably locking the spring to the casing in any predetermined prewound condition, comprising:
   (i) spaced holes in the bottom wall of the cup which are positioned on opposite sides of the position of the axis of the shaft,
   (ii) spaced elongated holes in the shaft extending from the said one end surface of the shaft in the direction of the axis of the shaft and being spaced equally to the holes in the bottom wall of the cup and being so positioned that they may be aligned with the holes in the bottom wall of the cup on rotation of the shaft with respect to the casing, and
   (iii) a U-shaped wire clip the legs of which are spaced equally to the spacing of the holes in the bottom wall of the cup and the holes in the shaft, said clip being positioned with its legs within the holes in the bottom wall of the cup and the holes in the shaft thereby to releasably connect the shaft to the casing.

* * * * *